July 6, 1943.  E. F. OSBORNE  2,323,617
TURBINE ENGINE
Filed Oct. 2, 1941  4 Sheets-Sheet 1
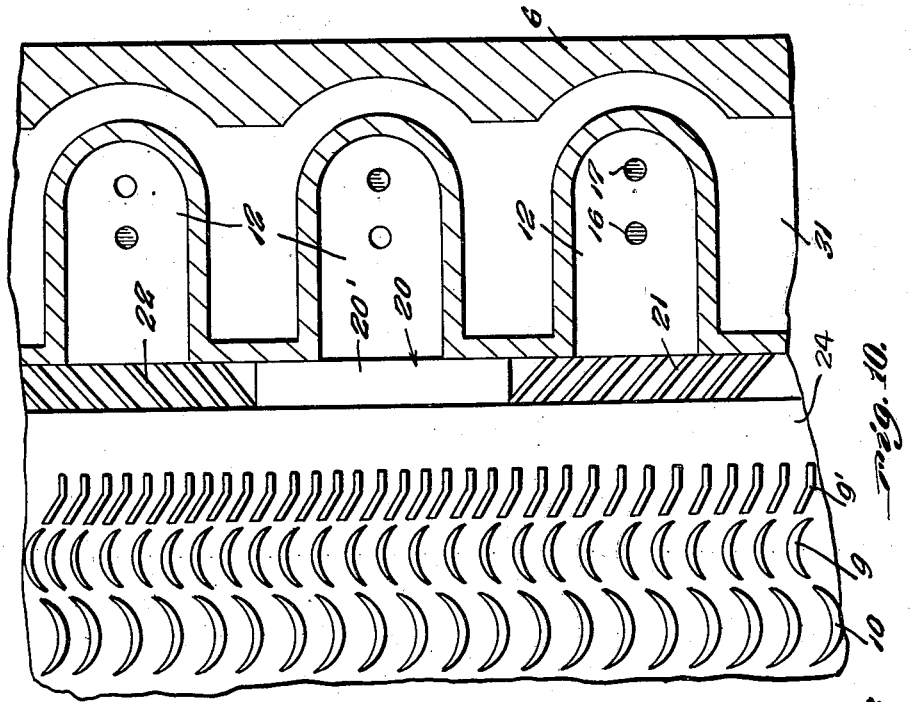
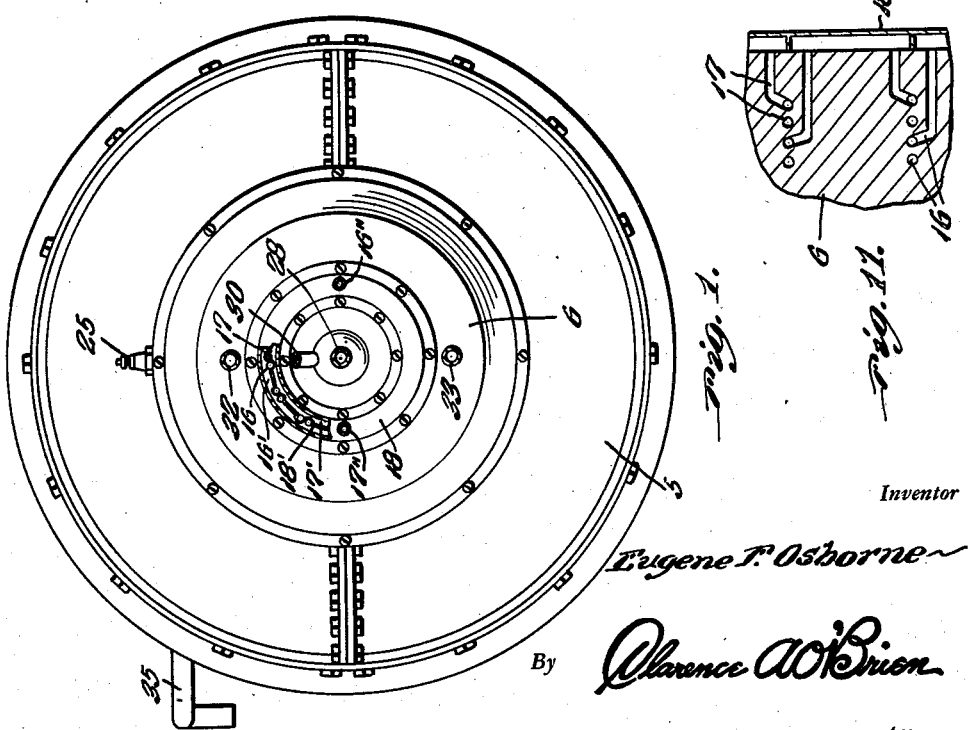
Inventor
*Eugene F. Osborne*
By *Clarence A. O'Brien*
Attorney

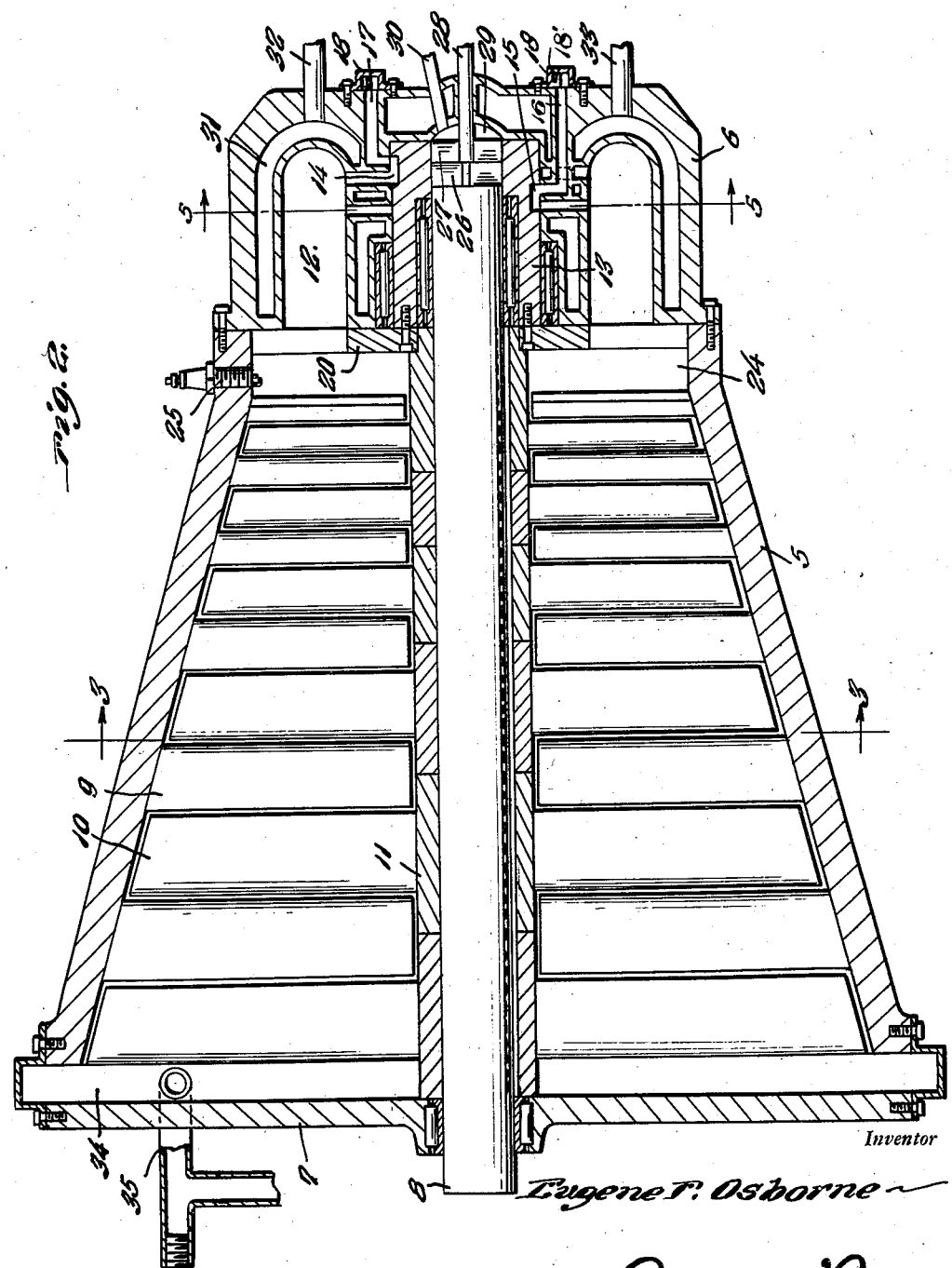

July 6, 1943.   E. F. OSBORNE   2,323,617
TURBINE ENGINE
Filed Oct. 2, 1941   4 Sheets-Sheet 3
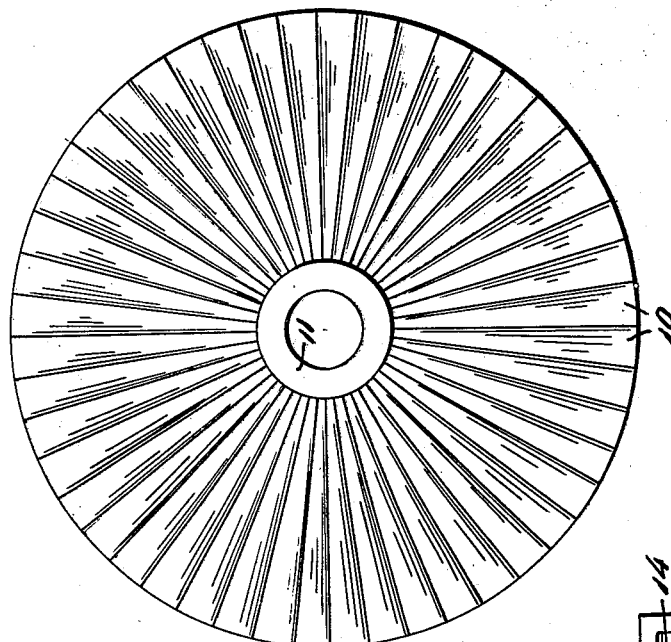
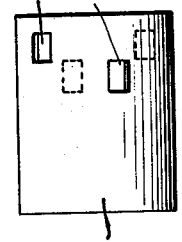
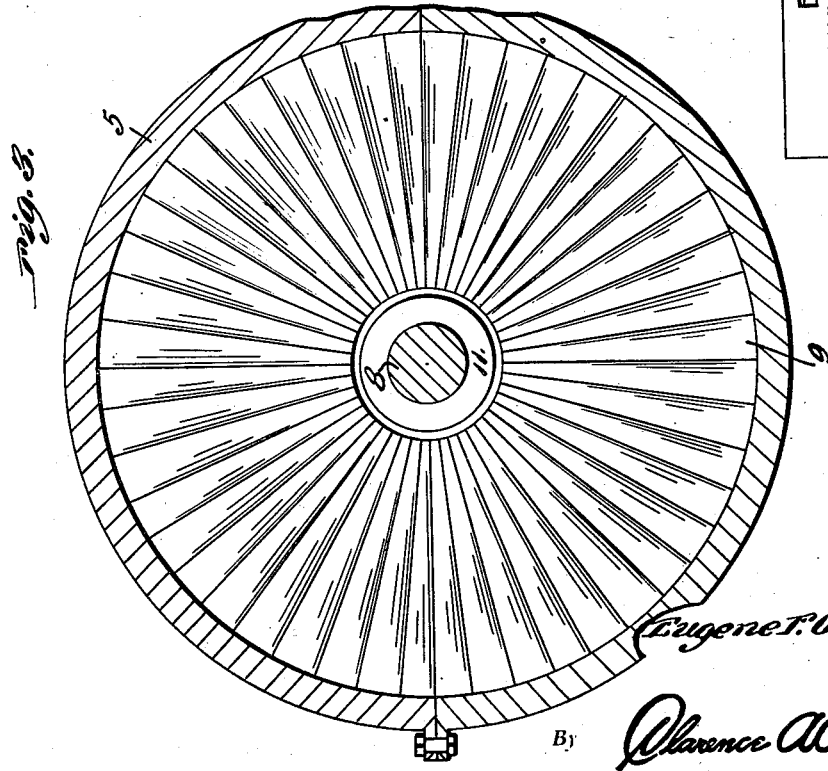
Inventor
Eugene F. Osborne
By Clarence A. O'Brien
Attorney

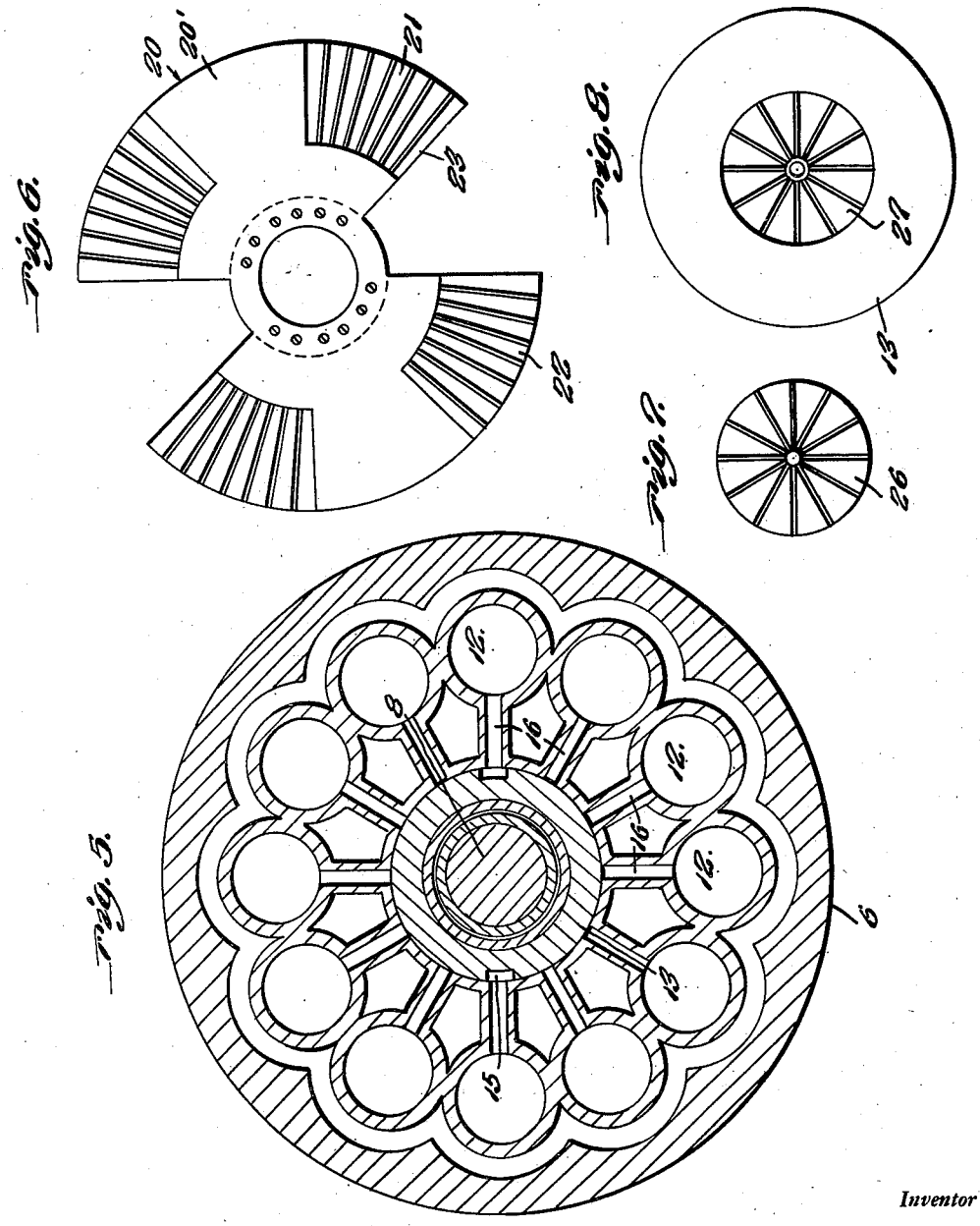

Patented July 6, 1943

2,323,617

UNITED STATES PATENT OFFICE 2,323,617

TURBINE ENGINE

Eugene F. Osborne, Peach Bottom, Pa.

Application October 2, 1941, Serial No. 413,351

1 Claim. (Cl. 60—41)

The present invention relates to new and useful improvements in engines of the Diesel type employing compressed air and fuel adapted to be mixed in the combustion chambers of the engine to produce an explosive charge and employing the use of turbine blades responsive to the action of the exploded charge of fuel for driving the shaft of the engine.

An important object of the present invention is to provide novel valve control means for the fuel and air admitted into the combustion chambers and to which is operatively connected a rotary disk-type valve controlling the compression and exhaust of the exploded gases from the combustion chambers.

A still further object of the present invention is to provide a novel turbine blade construction adapted to improve the efficiency of the engine.

A still further object is to provide an engine of this character which may be constructed in a compact form, in which vibrations are eliminated, and which at the same time is simple and practical in construction, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is an end elevational view with parts shown in section.

Figure 2 is a longitudinal sectional view through the engine.

Figure 3 is a transverse sectional view taken substantially on a line 3—3 of Figure 2.

Figure 4 is an end elevational view of the shaft with one of the sets of turbine blades secured thereto.

Figure 5 is a transverse sectional view taken substantially on a line 5—5 of Figure 2.

Figure 6 is a plan view of the compression and exhaust valves.

Figure 7 is a plan view of the blades at one end of the shaft for starting the engine.

Figure 8 is an enlarged end elevational view of the cylindrical rotary valve and engine starting blades.

Figure 9 is a side elevational view thereof.

Figure 10 is a diagram showing the cross-sectional contour of the turbine blades and disk valve, with parts of the engine head in section, and Figure 11 is a fragmentary sectional view of the engine head and showing the fuel and air passages.

Referring now to the drawings in detail, wherein for the purpose of illustration I have disclosed a preferred embodiment of the invention, the numeral 5 designates the substantially conical casing of the engine having a head 6 secured at one end and an end plate 7 secured at its other end, the end plate 7 having the shaft 8 journaled therein with one end of the shaft projecting longitudinally through the casing and terminating in the head 6 as shown to advantage in Figure 2 of the drawings.

Formed on the inner walls of the casing 5 and projecting radially inwardly thereof are a plurality of stationary blades 9 arranged in longitudinally spaced relation and positioned between the blades 9 are a plurality of rotary blades 10 projecting radially from sleeves 11 secured to the shaft 8.

The head 6 is formed with a plurality of longitudinally elongated combustion chambers 12 arranged in spaced concentric relation with respect to the end of the shaft 8 and rotatably mounted on the inner end of the shaft in the head 6 is a rotary valve 13 having longitudinally spaced recesses 14 and 15 formed in the outer surface of the valve. The recesses 14 form communicating passages for an interrupted fuel intake passage 17 while the recesses 15 provide communicating passages for an interrupted compressed air passage 16, both of said passages 16 and 17 communicating with the combustion chambers 12. The outer ends of the passages 16 and 17 communicate respectively with chambers 16' and 17' formed in a manifold 18, the chambers being separated by a partition 18', as shown to advantage in Figure 1. A pipe 16" connects the chamber 16' with a supply of compressed air and a fuel feed pipe 17" connects the chamber 17' with a suitable source of fuel supply (both not shown) to produce the explosive charge when mixed in the combustion chambers.

Secured to the inner end of the rotary valve 13 is a disk-type valve 20 shown in detail in Figure 6 of the drawings, the valve 20 being rotatable against the inner end of the head 6 for controlling exhaust from the combustion chambers 12. At the edge of the disk valve 20, at diametrically opposite sides, are provided a plurality of intake blades 21 while spaced circumferentially ninety degrees from the group of blades 21 are a plurality of exhaust blades 22, the exhaust blades 22 likewise being disposed at diametrically opposite edges of the valve 20. The disk 20 is also provided with openings 23 at diametrically opposite sides between the groups of blades 21 and 22 and imperforate portions 20'.

As more clearly illustrated in Figure 2 of the drawings, the disk valve 20 is spaced from the turbine blades to provide a chamber 24 with which the inner end of a spark plug 25 communicates.

The inner end of the shaft 8 is formed with a plurality of blades 26 inclined at an angle oppositely with respect to a plurality of blades 27 formed on the inner end of a shaft 28 journaled in the end of the head 6. Between the blades 27 and the head 6 is formed a chamber 29 in which oil or similar fluid is adapted to be supplied by means of a feed pipe 30.

Surrounding the combustion chambers 12 is a water jacket 31 having intake and discharge pipes 32 and 33 connected thereto.

The end plate 7 is also spaced from the adjacent turbine blade to provide an exhaust chamber 34 with which an exhaust pipe 35 is connected.

In the operation of the engine, an electric starter motor (not shown) is employed to rotate the shaft 28 to produce a fluid drive for operating the shaft 8 by means of the blades 26 and 27. The blades 27, at their peripheral edges, are also attached to the rotary valve 13 so that the latter is also operated by the shaft 28 to admit fuel and compressed air into the combustion chambers and into the chamber 24 where it is ignited by the spark plug 25. Following this initial operation of the engine, the motor employed for driving the shaft 28 is disconnected and the ignition for the spark plug 25 likewise is disconnected whereby the disk valve 20 will control the compression and firing of the fuel in the combustion chambers 12 in the manner of a Diesel type engine and admit the exhaust gases into the chamber 24 for operating the turbine blades and thus drive the shaft.

Four stages are necessary to complete a cycle of operation in the combustion chambers 12. First, the rotary valve 13 admits compressed air while the exhausting blades 22 of the valve 20 extract the spent gases; second, the valve 13 then admits fuel from the passages 17, at this time the imperforate portion 20' of the disk valve 20 prevents the spent gases from returning to the combustion chamber and thus permits compression of the charge in the chambers; third, both of the passages 16 and 17 are closed by the valve 13 while the intake blades 21 of the valve 20 further compress the fuel and air in the combustion chambers together with spent gases from the chamber 24; and fourth, the compressed charge is then fired at the time the open spaces 23 of the valve 20 pass across the chambers 12.

As shown to advantage in Figure 10, the stationary turbine blades 9 immediately adjacent the chamber 24 are inclined as shown at 9' to direct the exhaust gases against the inner curved faces of the next succeeding group of blades. The blades 9 and 10 are of crescent shape in cross-section with the blades 9 oppositely disposed with respect to the blades 10.

It is believed the details of construction and manner of use of the device will be readily understood from the foregoing without further detailed explanation.

Having thus described the invention what is claimed is:

An internal combustion turbine engine comprising a casing having a head thereon, a shaft journaled in the casing having turbine blades connected thereto, combustion chambers in the head having communication with the blades, valve means controlling intake of an explosive charge to the chambers, valve means controlling discharge of gases therefrom, opposed blades on the shaft and valve cooperating to provide a fluid drive connection therebetween, and a starting drive shaft connected to the blades of the valve.

EUGENE F. OSBORNE.